C. DOWSON.
SHUTTER FOR CINEMATOGRAPH APPARATUS.
APPLICATION FILED DEC. 14, 1915.
1,191,069.
Patented July 11, 1916.
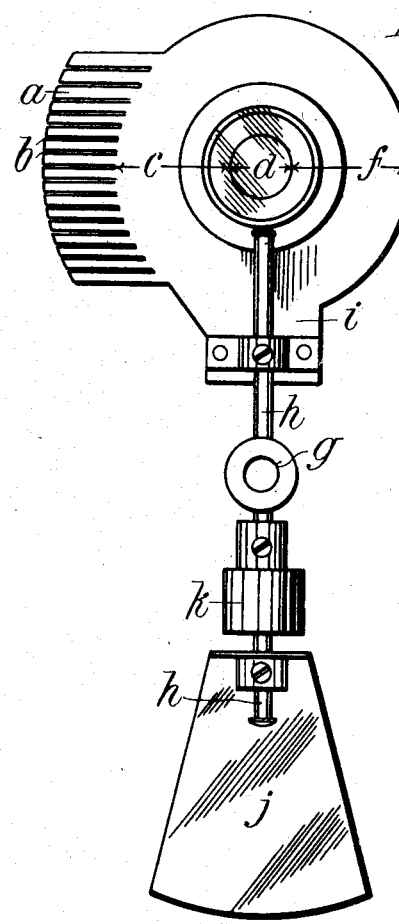
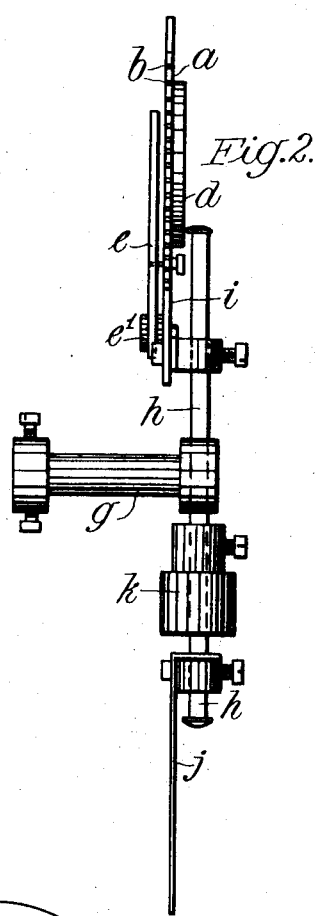
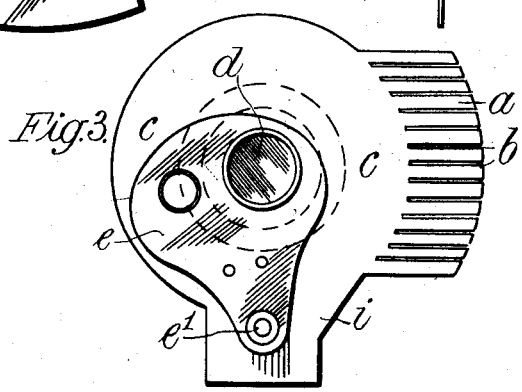
Inventor
C. Dowson.
by
Atty.

UNITED STATES PATENT OFFICE.

CHARLES DOWSON, OF ST. JOHN'S WOOD, LONDON, ENGLAND.

SHUTTER FOR CINEMATOGRAPH APPARATUS.

1,191,069.  Specification of Letters Patent.  Patented July 11, 1916.

Application filed December 14, 1915. Serial No. 66,717.

*To all whom it may concern:*

Be it known that I, CHARLES DOWSON, a subject of His Majesty the King of England, residing at St. John's Wood, in the county of London, Kingdom of England, have invented certain new and useful Improvements in or Relating to Shutters for Cinematograph Apparatus, of which the following is a specification.

This invention refers to improvements in or relating to shutters for cinematograph apparatus, and it more particularly concerns cover shutters for projectors.

The primary object of the present invention is to provide a simple and convenient apparatus adapted to permit a maximum amount of light to pass to the screen without affecting the definition of the picture or increasing the flicker but rather to reduce it.

According to the present invention I provide an improved shutter having one or more blades or cover plates provided with a lens as hereinafter described.

The invention is hereinafter described with reference to the accompanying drawings in which:—

Figure 1 is a face elevation of a shutter constructed according to the present invention; Fig. 2 is a side elevation thereof; and Fig. 3 is a detail view showing the reverse side of the improved cover plate or shutter.

In one preferred manner of carrying out the present invention, I may as shown, provide the shutter with a front or leading portion $a$ having a plurality of parallel slots $b$ cut therein after the manner of a comb, which when the change of picture is commencing in the film gate causes the screen to be dimly covered with diffused light. Next the shutter, by further movement through the beam of light, includes an opaque portion $c$ adapted to produce a dark period of short duration which in turn is followed by a further period of subdued light produced by a concave or other suitable lens $d$ of a predetermined size and focus. This lens $d$ is preferably provided with an adjustable diaphragm $e$ which is mounted pivotally on the shutter at $e'$. This period of light is in its turn followed on still further movement of the shutter, by a further opaque portion $f$ adapted to produce on the screen a further dark period of short duration which serves to prevent the diffusion of any light the eye may hold by persistence of vision passing from the preceding picture into the next picture about to be exposed.

In the construction illustrated the shutter comprises a central boss or sleeve $g$ adapted to be secured to the revolving shaft of the machine and a transverse shaft $h$ on which the blades or cover plates $i$ and $j$ constituting the shutter proper are adjustably or otherwise secured. As shown the shutter has only one of its blades or cover plates $i$ formed as above described, the other being a plain blade or plate which is secured to the opposite side of the shaft $h$ together with a suitable counterweight $k$ but obviously both blades or cover plates may be constructed in a similar manner to the plate $i$ if desired. If desired the comb like leading portion $a$ of the shutter may be dispensed with.

What I claim is:—

1. A shutter comprising a shaft, a blade on said shaft, a second blade on said shaft, one edge of the second blade having a series of open elongated slots, and a lens mounted in the second blade adjacent the open slots.

2. A shutter comprising a shaft, a plurality of blades on said shaft, means permitting movement of said blades on said shaft, a plurality of extensions spaced apart upon one of the blades, said blade having a central opening, and a lens mounted in said opening.

3. A shutter comprising a shaft, a plurality of blades on said shaft, the edge of one of said blades having a series of elongated open slots, the blade with the open slots being provided with a central opening, a lens in said opening, and means carried by said blade adapted to regulate the size of the lens opening.

4. A shutter comprising a shaft, a plurality of blades on said shaft, a plurality of extensions spaced apart upon one of said blades, said blade being provided with a central opening, a lens in said opening, means carried by said blade adapted to regulate the size of the lens opening, said means comprising a member pivoted to the blade adjacent the spring and provided with different sized openings adapted to register therewith, and means for holding one of said openings in proper registration with the lens opening.

5. A shutter comprising a shaft, a blade on said shaft, a second blade on said shaft, a plurality of transversely extending members spaced apart on said blade, a pivoted member on said blade, means for holding said pivoted member in a plurality of independent positions, the blade on said member being provided with registering apertures, the apertures on the pivoted member being of graduated size in order to control the diameter of the aperture in the blade, and means for rotating said shaft.

6. A shutter comprising a shaft, a plurality of blades on said shaft one of said blades being provided with an aperture therein, and a lens mounted in said aperture.

In testimony whereof I have hereunto signed my name to this specification.

CHARLES DOWSON.

Copies of this patent may be obtained for five cents each, by addressing the "Commissioner of Patents, Washington, D. C."